(No Model.)
P. H. STANDISH.
DEVICE FOR WELDING LINKS.
No. 258,493. Patented May 23, 1882.
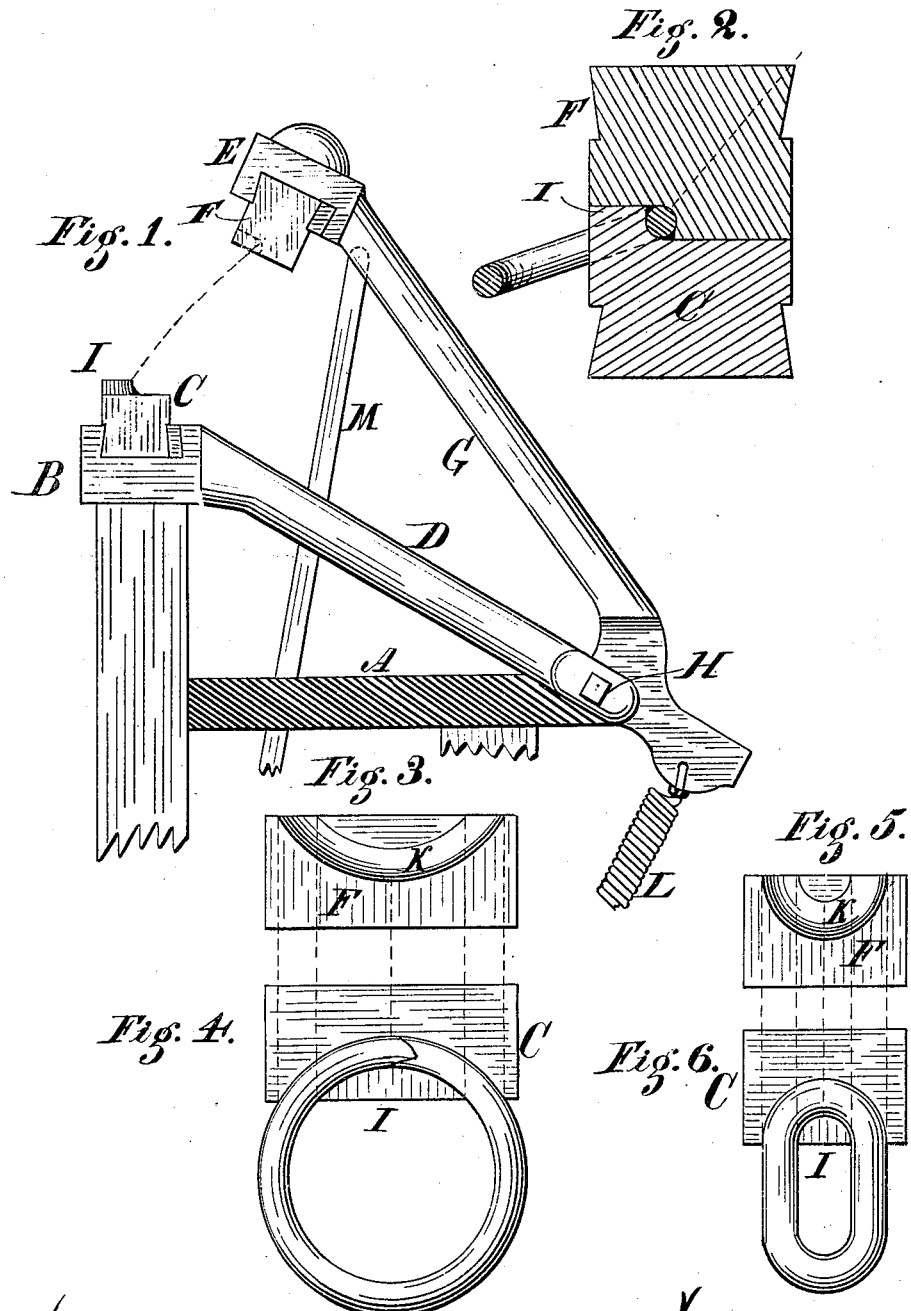
Attest,
Jno. E. Wiles,
Herbert P. Cook.
Inventor;
Philander H. Standish,
by Wood & Boyd
his Attorneys &c.

UNITED STATES PATENT OFFICE.

PHILANDER H. STANDISH, OF CINCINNATI, OHIO, ASSIGNOR OF ONE-HALF TO P. WILSON & SONS, OF SAME PLACE.

DEVICE FOR WELDING LINKS.

SPECIFICATION forming part of Letters Patent No. 258,493, dated May 23, 1882.

Application filed January 30, 1882. (No model.)

*To all whom it may concern:*

Be it known that I, PHILANDER HAYDEN STANDISH, a citizen of the United States, residing at the city of Cincinnati, in the county of Hamilton and State of Ohio, have invented certain new and useful Improvements in Devices for Welding Links, of which the following is a specification.

This invention relates to improvements in machines for welding links for chains, harness, and other purposes; and the object of the invention is to weld such links so as to avoid the presence of any fins in the completed article. This object I accomplish by the construction and arrangement of parts illustrated in the accompanying drawings, in which—

Figure 1 is a side elevation of the machine above the stand; Fig. 2, a section through both dies with a link inclosed. Fig. 3 is a view of the face or under side of the hammer-die. Fig. 4 is a top view of the anvil-die with a ring in place, and Figs. 5 and 6 similar views to the latter two, but showing an elliptical link.

The machine may be supported on any ordinary bench or base, the top of which is represented by A.

B represents an anvil provided with a groove for the dies C and a brace, D, connecting the anvil with the base A.

E represents the hammer-head, which is provided with a groove for the dies F. The arm G of the hammer is pivoted at H below the frame of the anvil, so that the stroke of the hammer will be delivered at an angle to the horizontal, and preferably about thirty degrees, as shown.

I represents a circuline swage-block projecting from the anvil, against which the inside of the link or ring bears, as shown in Figs. 4 and 6, the hammer-block being made with a groove the counterpart of the form desired to be given to the blank, as shown at K, Figs. 3 and 5, so as to correspond and register, as shown in Fig. 2 and indicated by the dotted lines connecting Figs. 3 and 4 and 5 and 6.

L represents a spring of sufficient strength to raise the hammer.

M represents a toggle-connection between the hammer and a foot-treadle. (Not shown.) The hammer may be caused to descend by hand, by a depression of the treadle, or by any of the well-known means of applying power.

The operation of the device is as follows:

I take a link-blank, which has been formed in any known manner, and after heating it to a welding degree place it around the projection I on the anvil-block with the scarfed ends in the center, as shown in Fig. 4, and at an inclination, as shown at Fig. 2. Then the hammer is caused to descend gently, so as to bring the ends in proper position for welding, where a second blow of the hammer will weld the link, but leaving a thin fin on the upper inner and lower outer peripheries of the ring. The ring is then to be turned over, when a third blow of the hammer will turn the fins over the joint, and so perfectly unite the ends that little or no indication of a weld will be visible, and the metal at this point as smooth and round as at others, which is a result not accomplished by any other machine.

Hammers which drop vertically leave fins on opposite sides in cross-section, which cannot be removed by turning the blank and repeating the blow, and this finishing feature by the third blow in my method is due to the angle at which the pressure of the hammer is exerted, which is indicated by the dotted lines on Fig. 2.

Having thus described my invention, what I claim as new, and desire to secure by Letters Patent, is—

1. In a machine for welding chain-links, the combination, substantially as hereinbefore described, of a stationary anvil, B, provided with an attached die, C, having the projection I, with the hammer-arm G, pivoted below the plane of the anvil, as described, and provided with the die F, having the recess K, as and for the purpose set forth.

2. In a machine for welding chain-links, the combination, substantially as hereinbefore described, of a base, A, a stationary anvil, B, carrying the die C, the inclined brace D, connected with the anvil and base, the hammer-arm G, pivoted below the plane of the anvil, and provided with a hammer-head carrying the die F, essentially as and for the purpose set forth.

In testimony whereof I have hereunto set my hand in the presence of two subscribing witnesses.

PHILANDER H. STANDISH.

Witnesses:
JNO. E. JONES,
CORNELIUS BYL.